US011094083B2

(12) United States Patent
Eisenmann et al.

(10) Patent No.: US 11,094,083 B2
(45) Date of Patent: Aug. 17, 2021

(54) UTILIZING A CRITICAL EDGE DETECTION NEURAL NETWORK AND A GEOMETRIC MODEL TO DETERMINE CAMERA PARAMETERS FROM A SINGLE DIGITAL IMAGE

(71) Applicant: Adobe Inc., San Jose, CA (US)

(72) Inventors: Jonathan Eisenmann, San Francisco, CA (US); Wenqi Xian, New York, NY (US); Matthew Fisher, San Francisco, CA (US); Geoffrey Oxholm, Albany (CA); Elya Shechtman, Seattle, WA (US)

(73) Assignee: ADOBE INC., San Jose, CA (US)

( * ) Notice: Subject to any disclaimer, the term of this patent is extended or adjusted under 35 U.S.C. 154(b) by 189 days.

(21) Appl. No.: 16/257,495

(22) Filed: Jan. 25, 2019

(65) Prior Publication Data

US 2020/0242804 A1    Jul. 30, 2020

(51) Int. Cl.
*G06T 7/80* (2017.01)
*G06T 7/12* (2017.01)
*G06T 7/13* (2017.01)

(52) U.S. Cl.
CPC .......... *G06T 7/80* (2017.01); *G06T 7/12* (2017.01); *G06T 7/13* (2017.01); *G06T 2207/20081* (2013.01); *G06T 2207/20084* (2013.01)

(58) Field of Classification Search
CPC .... G06T 7/80; G06T 7/12; G06T 7/13; G06T 2207/20081; G06T 2207/20084;

(Continued)

(56) References Cited

U.S. PATENT DOCUMENTS 9,098,885 B2    8/2015  Shechtman et al.
2010/0295948 A1*  11/2010  Xie ........................... G06T 7/80
                                                            348/175

(Continued)

FOREIGN PATENT DOCUMENTS

WO    WO 2020/068757 A1    4/2020

OTHER PUBLICATIONS

Itu et al., "Automatic extrinsic camera parameters calibration using Convolutional Neural Networks", 2017 13th IEEE International Conference on Intelligent Computer Communication and Processing (ICCP), Sep. 7-9, 2017, pp. 273-278 (Year: 2017).*

(Continued)

*Primary Examiner* — Nay A Maung
*Assistant Examiner* — Jose M Torres
(74) *Attorney, Agent, or Firm* — Keller Jolley Preece

(57) ABSTRACT

The present disclosure relates to systems, non-transitory computer-readable media, and methods for utilizing a critical edge detection neural network and a geometric model to determine camera parameters from a single digital image. In particular, in one or more embodiments, the disclosed systems can train and utilize a critical edge detection neural network to generate a vanishing edge map indicating vanishing lines from the digital image. The system can then utilize the vanishing edge map to more accurately and efficiently determine camera parameters by applying a geometric model to the vanishing edge map. Further, the system can generate ground truth vanishing line data from a set of training digital images for training the critical edge detection neural network.

20 Claims, 12 Drawing Sheets

(58) Field of Classification Search
CPC ....... G06T 7/70; G06T 7/536; G06T 2200/24; G06T 2207/20004; G06T 2207/20061; G06N 20/00
See application file for complete search history.

(56) References Cited

U.S. PATENT DOCUMENTS

| | | | |
|---|---|---|---|
| 2013/0286221 A1* | 10/2013 | Shechtman | G06T 7/80 348/187 |
| 2016/0350921 A1* | 12/2016 | Bataller | G06K 9/00771 |
| 2020/0074661 A1 | 3/2020 | Anisimovskiy et al. | |
| 2020/0082182 A1* | 3/2020 | Lee | G06K 9/00825 |
| 2020/0097738 A1* | 3/2020 | Aragon | H04N 5/265 |
| 2020/0250440 A1* | 8/2020 | Campos | G06N 3/08 |

OTHER PUBLICATIONS

Search and Examination Report as received in United Kingdom Application GB1916984.6 dated May 1, 2020.
Hyunjoon Lee, Eli Shechtman, Jue Wang, and Seungyong Lee, Automatic Upright Adjustment of Photographs, Journal of Latex Class Files, vol. 6, No. 1 (Jan. 2007).
Alejandro Newell, Kaiyu Yang, and Jia Den, Stacked Hourglass Networks for Human Pose Estimation, European Conference on Computer Vision (2016).

* cited by examiner

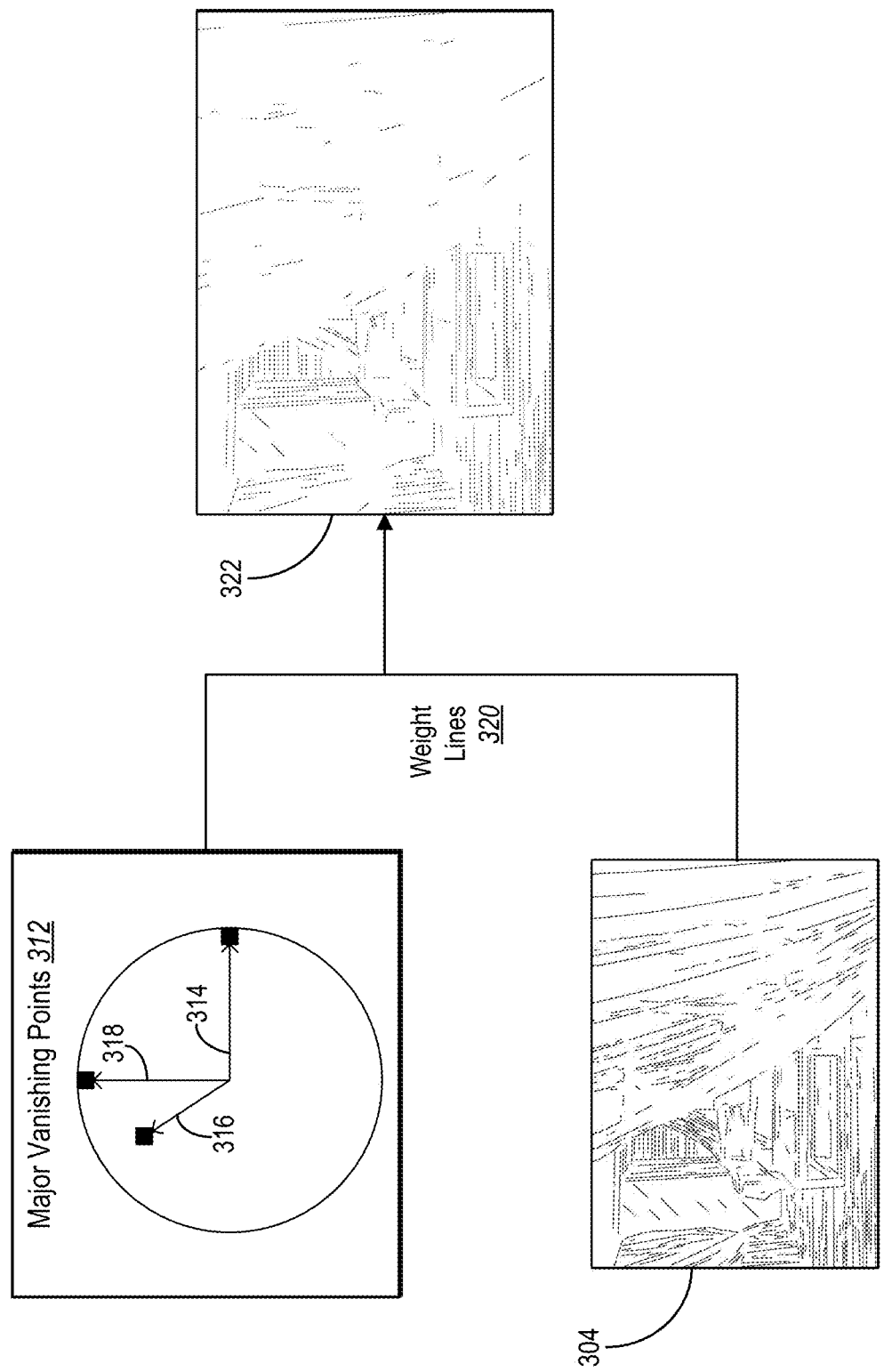

UTILIZING A CRITICAL EDGE DETECTION NEURAL NETWORK AND A GEOMETRIC MODEL TO DETERMINE CAMERA PARAMETERS FROM A SINGLE DIGITAL IMAGE

BACKGROUND

Recent years have seen significant improvements in the field of digital image analysis and editing. Due to advances in algorithms and hardware, conventional digital image analysis systems are now able to analyze and edit digital images in a variety of ways. For example, conventional digital image analysis systems can reproject digital images to make them appear visually aligned (e.g., upright) and add or subtract objects portrayed in digital images. Indeed, conventional digital image analysis systems can (with camera parameters in hand) size and orient a new digital object to fit within a three-dimensional scene portrayed in the digital image. In such three-dimensional compositing it is critical to have a precise estimate of the camera calibration to ensure that the foreground and background elements have matching perspective distortion in the final rendered image.

Although conventional digital image analysis systems have progressed in recent years, they still have several significant shortcomings in relation to accuracy, flexibility, and efficiency. For example, some conventional digital image analysis systems can determine camera parameters and modify digital images utilizing a convolutional neural network. In particular, conventional digital analysis systems can train a convolutional neural network to identify camera parameters from a digital image. Such systems, however, are not very precise and/or accurate. Indeed, many digital image analysis systems that utilize convolutional neural networks determine camera parameters have a high rate of error. As a result, such systems also generate modified digital images that are not accurate, realistic, or visually appealing.

Some conventional digital image analysis systems utilize geometric approaches to determine camera parameters from digital images. For example, such conventional systems can analyze geometric shapes in the digital image to identify edges and determine camera parameters at the time the digital image was captured based on the identified edges. Such systems, however, are not robust or flexible. Indeed, conventional systems that utilize geometric approaches have significant problems with accuracy when analyzing digital images that contain misleading or confusing shapes and/or lines (e.g., lack strong vanishing lines). For instance, digital images that contain a variety of round objects, curved objects, or lines that point in random directions can undermine the accuracy of geometric models.

Some conventional systems can determine camera parameters by analyzing multiple digital images of the same subject (e.g., the same scene or object). Such systems are inefficient, as they require extensive computer resources and processing of multiple images to extract a set of camera parameters. Further, such systems offer little flexibility, as they require digital images conforming to specific criteria, and in many cases a user is unlikely to possess the requisite images (i.e., a large number of digital images portraying the same subject) for the system to work properly. In addition, many systems require extensive computer processing resources and time to generate and utilize training data.

These along with additional problems and issues exist with regard to conventional digital image analysis systems.

BRIEF SUMMARY

Embodiments of the present disclosure provide benefits and/or solve one or more of the foregoing or other problems in the art with systems, non-transitory computer-readable media, and computer-implemented methods for determining camera calibration and generating enhanced digital images utilizing a critical edge detection neural network and geometric model. In particular, the disclosed systems can accurately, efficiently, and flexibly determine camera parameters, such as focal length, pitch, roll, and yaw, based on a single digital image. For example, in one or more embodiments, the disclosed systems utilize a deep-learning based framework to weight edges in a digital image (e.g., to identify vanishing lines that are relevant to digital image perspective). The disclosed systems can then utilize the vanishing lines in conjunction with a geometric model to accurately identify camera parameters and generate a modified digital image. To further enhance efficiency and accuracy, the disclosed system can also generate accurate training data from existing digital image repositories and use this training data to train a critical edge detection neural network. Specifically, the disclosed systems can generate ground truth vanishing lines from training digital images and utilize the ground truth vanishing lines to train a critical edge detection neural network to identify critical edges. Upon training, the system can utilize the critical edge detection neural network in conjunction with a geometric model to more accurately determine camera parameters and generate a modified digital image.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 3A-3C illustrate a process of generating ground truth vanishing lines from a set of training digital images in accordance with one or more embodiments.

DETAILED DESCRIPTION

Figure 1:
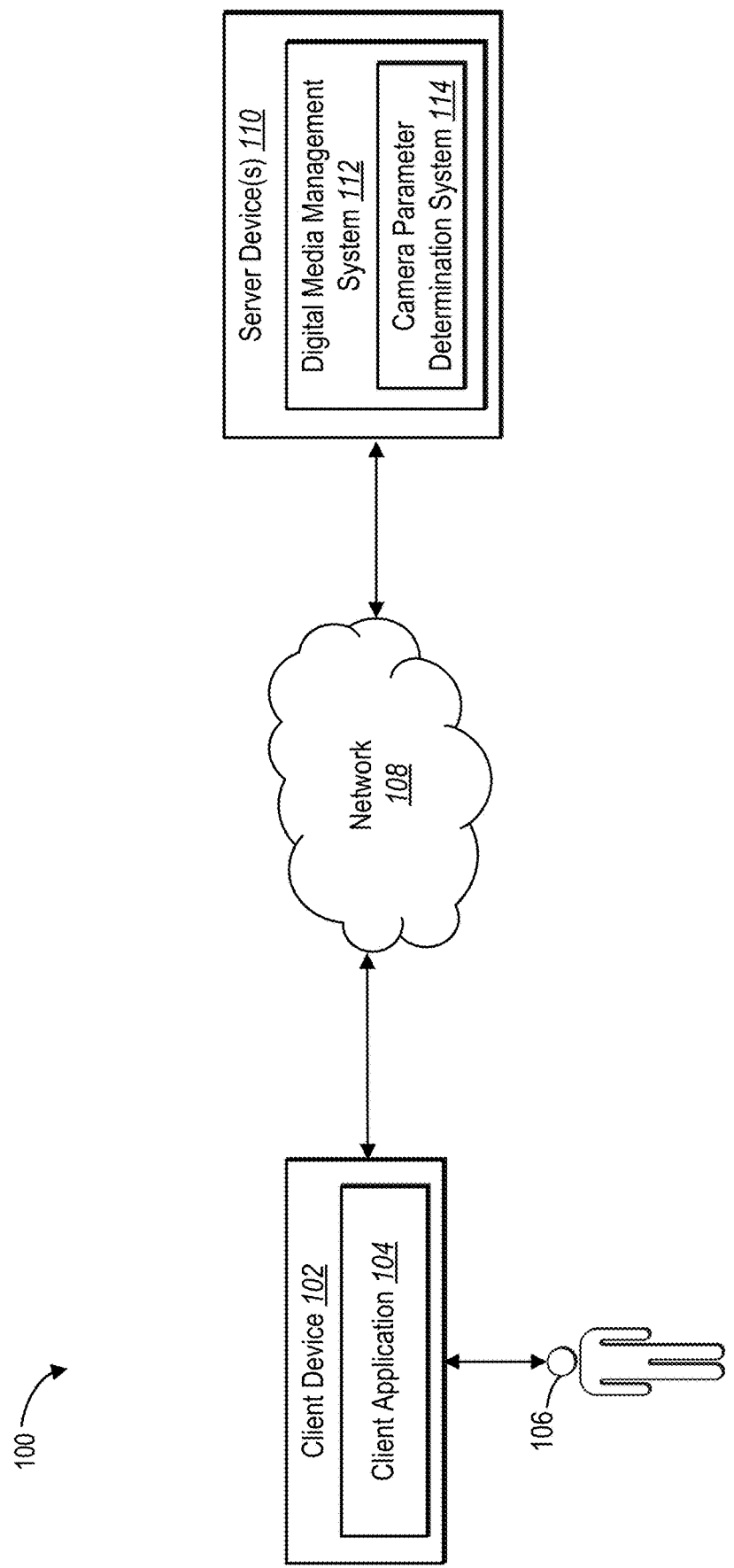
FIG. 1 illustrates a diagram of an environment in which a camera parameter determination system can operate in accordance with one or more embodiments.

This disclosure describes one or more embodiments of a camera parameter determination system that can utilize a critical edge detection neural network in conjunction with a geometric model to identify camera parameters from a single digital image. The camera parameter determination system can train a critical edge detection neural network to identify vanishing lines in a digital image and generate an edge map (e.g., an edge map that weights vanishing lines that indicate perspective within the digital image). The camera parameter determination system can then utilize a geometric model to analyze the edge map generated by the critical edge detection neural network and identify camera calibration. The camera parameter determination system can further improve accuracy and efficiency by generating ground truth data for training the critical edge detection neural network.

To illustrate, the camera parameter determination system can generate ground truth vanishing lines from a set of training digital images. Specifically, in one or more embodiments the camera parameter determination system identifies lines (e.g., edges) in a training digital image and determines vanishing points by analyzing the lines. Based on distances between the vanishing points and the lines in the digital image, the camera parameter determination system can identify ground truth vanishing lines. Then, the camera parameter determination system can utilize the training digital images and the ground truth vanishing lines to train a critical edge detection neural network to identify vanishing lines in digital images. When the critical edge detection neural network is trained, the camera parameter determination system can utilize the critical edge detection neural network to generate a vanishing edge map that indicates vanishing lines for a digital image. In one or more embodiments, the camera parameter determination system utilizes the vanishing edge map (e.g., by applying a geometric model) to more accurately and efficiently determine camera parameters for the digital image.

As mentioned above, in some embodiments the camera parameter determination system identifies ground truth vanishing lines for a set of training images. More specifically, the camera parameter determination system can map a digital image onto a sphere and divide the sphere into regions or "bins." Then, the camera parameter determination system can identify each of the intersections of two or more lines on the sphere. In one or more embodiments, the camera parameter determination system utilizes a distance-based voting scheme among the lines, intersections, and/or pixels of the digital image to determine the major vanishing points of the image. In some embodiments, the camera parameter determination system utilizes the major vanishing points to determine, based on distances between the various lines in the digital image and the major vanishing points, whether each line in the digital image is a ground truth vanishing line.

Additionally, as discussed above, the camera parameter determination system can train a critical edge detection neural network. In particular, in one or more embodiments the camera parameter determination system utilizes the ground truth vanishing lines for the training images to train a critical edge detection neural network to determine vanishing lines in a supervised manner. Specifically, as discussed in greater detail below with regard to FIG. 4, the camera parameter determination system can utilize a loss function in conjunction with the ground truth vanishing lines to train the critical edge detection neural network to identify vanishing lines in a digital image. In this manner, the camera parameter determination system can train a critical edge detection neural network to identify vanishing lines based on contextual information analyzed at various levels of abstraction within the digital image.

Further, the camera parameter determination system can utilize a trained critical edge detection neural network to identify vanishing lines in a digital image and generate a vanishing edge map. In one or more embodiments, once the critical edge detection neural network is trained, the camera parameter determination system can utilize the critical edge detection neural network to generate a vanishing edge map that comprises a plurality of edge weights. Specifically, the vanishing edge map can include a weight for each pixel that indicates a probability that each pixel corresponds to a vanishing line in the digital image.

The camera parameter determination system can utilize a vanishing edge map to determine camera parameters for a corresponding digital image. More specifically, the camera parameter determination system can apply a geometric model to the vanishing edge map to accurately determine focal length, pitch, roll, and yaw. Indeed, because the camera parameter determination system can apply the geometric model to the vanishing edge map (rather than a host of misleading or erroneous lines contained in the digital image), the camera parameter determination system can improve the accuracy of resulting camera parameters.

The camera parameter determination system can also utilize determined camera parameters to perform various functions with a digital image. For example, the camera parameter determination system can generate an enhanced digital image. More specifically, the camera parameter determination system can accurately and seamlessly add objects to a three-dimensional scene portrayed in a digital image. The camera parameter determination system can also reproject digital images to align vertical and horizontal lines to vanishing points. Moreover, the camera parameter determination system can generate/estimate a three-dimensional model of a scene or object portrayed in a digital image based on the camera parameters and the digital image.

The camera parameter determination system provides many advantages and benefits over conventional systems and methods. For example, the camera parameter determination system can improve accuracy relative to conventional systems. Indeed, by applying a critical edge detection neural network to generate accurate vanishing lines and then utilizing a geometric model to analyze the vanishing lines, the camera parameter determination system can accurately determine camera parameters and generate more accurate and realistic enhanced digital images. Thus, in contrast to conventional systems that utilize convolutional neural networks that predict camera parameters, the camera parameter determination system can utilize a geometric model focused on analyzing accurate vanishing lines generated by a critical edge detection neural network to produce accurate camera parameters.

In addition, the camera parameter determination system can improve flexibility relative to conventional systems. For instance, in one or more embodiments the camera parameter determination system utilizes a critical edge detection neural network to filter out inaccurate or misleading lines that fail to reflect image perspective. The camera parameter determination system can then apply a geometric model to the remaining accurate vanishing lines. Thus, the camera parameter determination system can robustly generate accurate camera parameters in a wide variety of digital images, even digital images that include rounded shapes or random lines. The camera parameter determination system can also improve flexibility by determining camera parameters based on a single digital image (rather than requiring users to capture and provide multiple digital images of an object or scene).

Further, the camera parameter determination system can improve efficiency of implementing computing systems. In contrast to conventional systems, the camera parameter determination system can determine camera parameters by analyzing a single digital image (rather than analyzing multiple digital images). In addition, the camera parameter determination system can efficiently generate and utilize training data (e.g., from existing digital image repositories) for training the critical edge detection neural network. This can significantly reduce the processing power and time required to generate and utilize conventional, labeled training data.

In sum, by utilizing a critical edge detection neural network, the camera parameter determination system can utilize contextual information in the image to determine accurate vanishing lines (e.g. a first edge is from a baseboard, so the edge is likely to point to a vanishing point, or a second edge is part of a stairway banister and likely to be distracting). Moreover, the camera parameter determination system can utilize the precision of geometric models where such models are likely to succeed, yielding a better overall performance relative to conventional systems.

As illustrated by the foregoing discussion, the present disclosure utilizes a variety of terms to describe features and benefits of the dynamic representation management system. Additional detail is hereafter provided regarding the meaning of these terms as used in this disclosure. For example, as used herein, the term "digital image" refers to any digital symbol, picture, icon, or illustration. For example, the term "digital image" includes digital files with the following, or other, file extensions: JPG, TIFF, BMP, PNG, RAW, or PDF. The term "digital image" also includes one or more images (e.g., frames) in a digital video. Additionally, the term "digital image" refers to 3D objects represented in a digital format. For example, the term "digital image" includes digital files with the following, or other, file extensions: OBJ, DAE, 3DS, U3D, and KMZ. Accordingly, although much of the description herein is phrased in terms of digital images, it will be appreciated that the disclosure can also apply to extracting properties from and/or editing digital video. Additionally, as used herein, the term "training digital image" refers to a digital image used to train a neural network. In particular, the term "training digital image" can include a digital image associated with ground-truth data that can be utilized to train a neural network.

As used herein, the term "camera device" refers to any device that can be used to capture images. In particular, the term "camera device" can include a device that is able to capture any kind of digital image, as described above. To illustrate, a camera device can include a digital or film camera, a mobile phone or other mobile device, a tablet, a computer, or any other device that can capture images.

Additionally, as used herein, the term "camera parameters" refers to characteristics or properties of a camera device utilized to capture a digital image. In particular, the term "camera parameters" can include characteristics of a camera device at the time of capture of a digital that impact the appearance of the digital image. To illustrate, a camera parameter can include focal length, field of view, pitch, roll, and/or yaw.

Also, as used herein, the term "neural network" refers to a machine learning model that can be tuned (e.g., trained) based on inputs to approximate unknown functions. In particular, the term "neural network" can include a model of interconnected layers that communicate and analyze attributes at varying degrees of abstraction to learn to approximate complex functions and generate outputs based on a plurality of inputs provided to the model. For instance, the term "neural network" includes one or more machine learning algorithms. In other words, a neural network includes an algorithm that implements deep learning techniques, i.e., machine learning that utilizes a set of algorithms to attempt to model high-level abstractions in data. Additional detail regarding exemplary neural networks and corresponding network architectures are provided below.

Further, as used herein, the term "critical edge detection neural network" refers to a neural network for identifying vanishing lines from a digital image. For example, a critical edge detection neural network can include a neural network (e.g., for generating a vanishing edge map that comprises vanishing lines from a digital image). In one or more embodiments, the critical edge detection neural network comprises a convolutional neural network, such as a stacked hourglass network. Additional detail regarding exemplary architectures and capabilities of a critical edge detection neural network are discussed in greater detail below (e.g., with regard to FIGS. 2, 4, and 5-6).

Additionally, as used herein, the term "vanishing point" refers to a region in an image that indicates perspective (e.g., a perspective relevant point or direction in which lines in an image appear to converge). In particular, the term "vanishing point" can include a point, vector, line, or region (e.g., an "eye point," horizon line, or north pole) in a digital image where the two-dimensional perspective projections of mutually parallel lines in three-dimensional space appear to converge. A vanishing point can include a horizontal vanishing point (e.g., a common direction/line/point/region along a horizon such as an Atlanta vanishing point), a vertical vanishing point (e.g., a common direction/line/point/region for vertical lines of a digital image), or other vanishing point. A vanishing point can take a variety of forms, such as a point in two-dimensional space where lines converge. In three-dimensional applications (e.g., when a digital image is mapped to a three-dimensional panoramic sphere), the term vanishing point can also include a vanishing direction (e.g., a vector indicating a direction where perspective lines in the image point or intersect). Indeed, in some embodiments, the camera parameter determination system identifies vanishing points that include orthogonal vanishing directions in three-dimensional space (e.g., vanishing directions in orthogonal x, y, and z directions). Indeed, in one or more embodiments, vanishing points correspond to three Manhattan directions that reflect x, y, and z directions respectively.

Also, as used herein, the term "vanishing lines" refers to lines in a digital image that correspond to one or more vanishing points in a digital image. In particular, the term "vanishing lines" can include lines that converge at a vanishing point (e.g., at a horizon vanishing point or a vertical vanishing point), that are close to a vanishing point, or that align with a vanishing point.

As used herein, the term "ground truth" refers to information of a known set of pixels reflecting a known set of properties for a digital image utilized to train a neural network. For example, ground truth vanishing lines can include known vanishing lines identified from a digital image (e.g., lines that point toward a vanishing point). The camera parameter determination system can utilize ground truth vanishing lines to train a critical edge detection neural network.

Further, as used herein, the term "training line" refers to lines identified in a training digital image. In particular, the term "training line" can include a line identified by applying an edge detection model to a training digital image. Thus, a training line can include any line or edge portrayed in a training digital image. As discussed in greater detail below, the camera parameter determination system can determine ground truth vanishing lines from training lines in a training digital image.

Also, as used herein, the term "vanishing edge map" refers to a representation of vanishing lines from a digital image. To illustrate, a vanishing edge map can comprise an array, vector, database, or image (e.g., black and white or greyscale image) where each entry represents a pixel of the digital image and indicates whether the pixel corresponds to a vanishing line. In one or more embodiments, a vanishing edge map comprises weights (i.e., a weighted vanishing edge map), where each weight indicates a confidence value (e.g., a measure of confidence such as a probability) that a corresponding pixel portrays a portion of a vanishing line within the digital image.

Similarly, as used herein, the term "weighted vanishing edge map" refers to a vanishing edge map for a digital image generated based on weights for the lines in the image. To illustrate, the camera parameter determination system can determine weights for each line in a digital image based on various criteria, including line length and/or distance between the lines and one or more vanishing points (i.e. angular distance between the lines in the image and the vanishing points and/or linear distance between the vanishing points and intersections of lines in the image). Then, the camera parameter determination system may generate a vanishing edge map by applying the weights. For example, the camera parameter determination system can determine lines for inclusion in the weighted vanishing edge map based on the weights (e.g., whether the weights satisfy a threshold value).

Also, as used herein, the term "weights" refers to a value utilized to emphasize and/or de-emphasize one or more pixels. For example, a weight can include a confidence value (e.g., any measure of confidence, such as a probability value). For example, the term "weight" may refer to a confidence value that a given line is a vanishing line or a confidence value that a given pixel is included in a vanishing line. Further, as used herein, the term "training weight" refers to a weight of a line and/or pixel in a training image. More specifically, a training weight may be utilized as part of a training image to train a critical edge detection neural network.

Additionally, as used herein, the term "geometric model" refers to a model that analyzes lines and/or shapes in a digital image to estimate camera parameters. For example, the term "geometric model" may refer to a model that groups oriented elements from a digital image and refines them iteratively in order to estimate directions or camera parameters for the image. To illustrate, the term "geometric model" may include models that search for converging lines and their intersections to determine vertical and/or horizontal directions and/or camera parameters in a digital image.

Additional detail will now be provided regarding the camera parameter determination system in relation to illustrative figures portraying exemplary embodiments. In particular, FIG. 1 illustrates a camera parameter determination environment 100. As illustrated in FIG. 1, the camera parameter determination environment 100 includes a client device 102, including a client application 104, and associated with a user 106. The client device 102 communicates, via a network 108, with the server device(s) 110. The server device(s) 110 can include a digital media management system 112, which in turn can include the camera parameter determination system 114.

Although FIG. 1 illustrates the camera parameter determination system 114 implemented via the server device(s) 110, the dynamic representation management system 114 can be implemented via other components. For example, the camera parameter determination system 114 can be implemented in whole, or in part, by the client device 102. Similarly, the camera parameter determination system 114 can be implemented via both the client device 102 and the server device(s) 110.

The client device 102 can include various types of computing devices. For example, the client device 102 can be a mobile device (e.g., a smart phone), tablet, laptop computer, desktop computer, or any other type of computing device as further explained below with reference to FIG. 10. Additionally, the client application 104 can include any one of various types of client applications. For example, the client application 104 can be an online application (e.g., a web browser), and a user 106 at the client device 102 can enter a Uniform Resource Locator (URL) or other address directing the web browser to a server device(s) 110. Alternatively, the client application 104 can be a different native application developed for use on the client device 102.

Additionally, the server device(s) 110 can include one or more computing devices including those explained below with reference to FIG. 10. In some embodiments, the server device(s) 110 comprises a content server. The server device(s) 110 can also comprise an application server, a communication server, a web-hosting server, a social networking server, or a digital content campaign server.

The client device 102, server device(s) 110, and network 108 may communicate using any communication platforms and technologies suitable for transporting data and/or communication signals, including any known communication technologies, devices, media, and protocols supportive of data communications, examples of which are described with reference to FIG. 10.

Although not a requirement, the camera parameter determination system 114 can be part of a digital media management system 112. The digital media management system 112 gathers, monitors, manages, edits, distributes, and analyzes various media. For example, the digital media management system 112 can analyze and edit digital images and/or digital video based on user input identified via one or more user interfaces at the client device 102. In one or more embodiments, the digital media management system 112 can utilize the camera parameter determination system 114 to determine camera parameters and/or modify digital images based on the camera parameters. For example, the digital media management system 112 can provide the camera parameter determination system 114 with digital images and the camera parameter determination system 114 can provide the digital media management system 112 with camera parameters for the provided images. In other embodiments, the server device(s) 110 can include a system other than the digital media management system 112, and the camera parameter determination system 114 can receive images via alternate means. For example, the server device(s) 110 can receive images via the network 108 from the client device 102 or from another source. As discussed above, the camera parameter determination system 114 can efficiently, accurately, and flexibly determine camera parameters for a digital image. In particular, FIG. 2 shows an overview of determining camera parameters for digital images in accordance with one or more embodiments.

Figure 2:
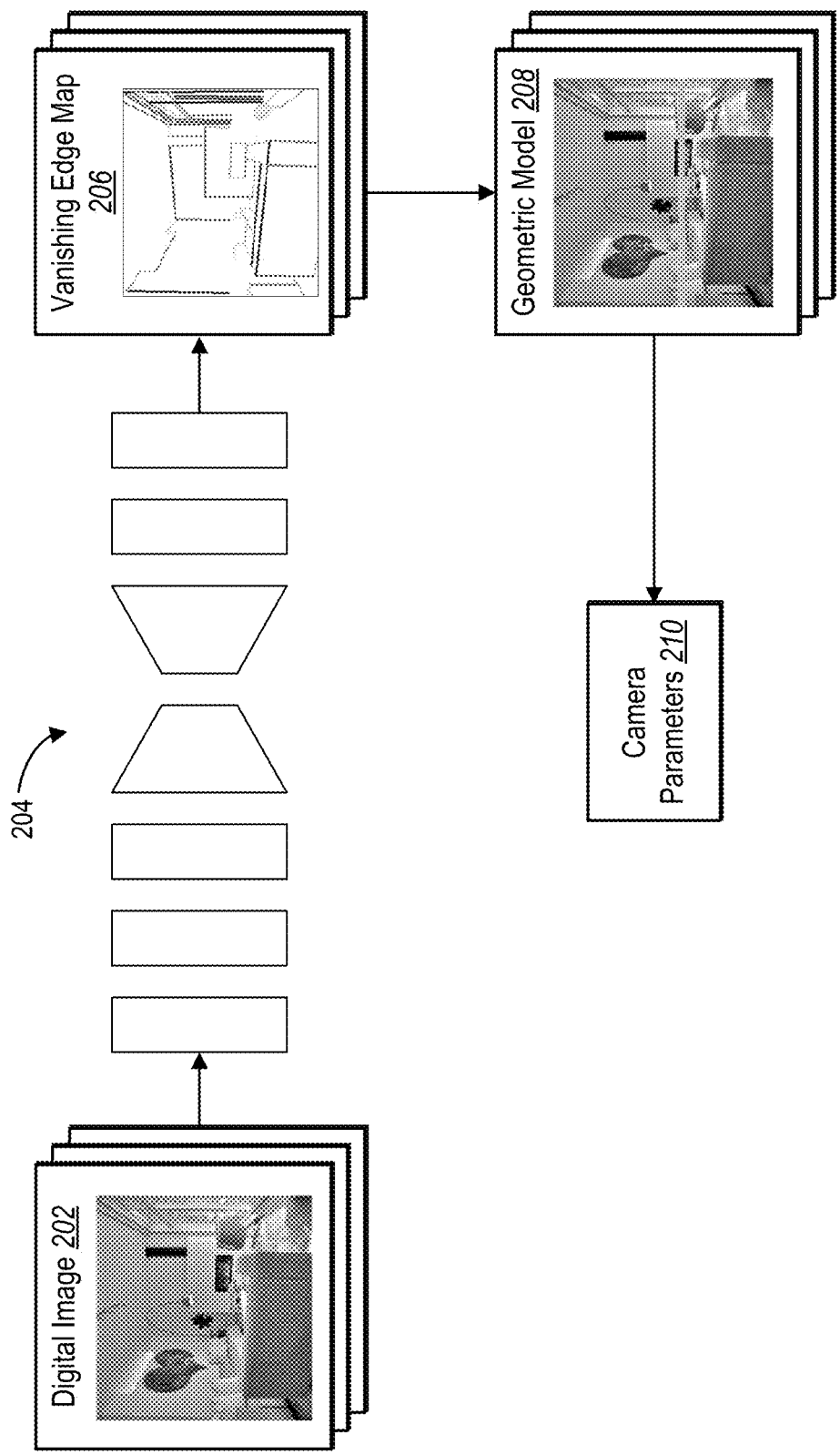
FIG. 2 illustrates an overview of determining camera parameters for a digital image in accordance with one or more embodiments.

Specifically, as shown in FIG. 2, the camera parameter determination system 114 provides a digital image 202 to a critical edge detection neural network 204, which generates a vanishing edge map 206. The camera parameter determination system 114 can then apply a geometric model 208 to the vanishing edge map 206. Further, the camera parameter determination system 114 can utilize the geometric model 208 to determine camera parameters 210 for the digital image 202.

As shown in FIG. 2, the camera parameter determination system 114 receives a digital image 202 and determines the camera parameters for that image. The digital image 202 can be any of various file types and can depict any of various scene types. Further, the camera parameter determination system 114 can determine the camera parameters for many digital images and do so without regard to similarities or differences between the file or scene types of a set of digital images.

As further illustrated in FIG. 2, the camera parameter determination system 114 can utilize a critical edge detection neural network 204 to generate a vanishing edge map 206. As will be described in greater detail with regard to FIGS. 3-4, the camera parameter determination system 114 can train a critical edge detection neural network to generate a vanishing edge map 206 including the vanishing lines from a digital image. The critical edge detection neural network 204 can identify lines in the digital image 202 and can determine whether each of the lines in the digital image is a vanishing line (e.g., a vanishing line corresponding to a vanishing point). As illustrated, the critical edge detection neural network 204 utilizes the identified vanishing lines from the digital image 202 to generate a vanishing edge map (e.g., that includes each of the vanishing lines from the digital image 202 and none of the lines from the digital image that are not vanishing lines).

As shown in FIG. 2, the camera parameter determination system 114 utilizes a geometric model 208 to generate camera parameters 210 from the vanishing edge map 206. The geometric model 208 detects vanishing lines in the vanishing edge map 206 and use the vanishing lines to estimate vanishing points and camera parameters for the digital image 202. Upright can perform this by grouping oriented lines from the vanishing edge map 206 into a number of vanishing points in the scene and refining them iteratively. Applying the geometric model 208 to the vanishing edge map 206 (instead of the digital image 202) leads to more accurate results, because misleading or "false" line segments are not present. Accordingly, based on applying the geometric model 208 to the vanishing edge map 206, the camera parameter determination system 114 is able to more accurately and efficiently determine camera parameters 210 for the digital image 202.

The geometric model 208 utilizes optimization-based camera calibration to estimate vanishing lines, vanishing points, and camera parameters for a digital image. The geometric model can also perform upright adjustments in which the model automatically modifies lines in the image to straighten the digital image. The adjustments bring slanted lines into accordance with how human perception would expect to see the image. In other words, the geometric model 208 can remove distortions relative to human observation. Such adjustment can be helpful in the context of an image with strong geometric cues, such as images including large manmade structures.

To determine camera parameters for the image, the geometric model 208 performs an edge detection algorithm on the digital image to identify lines in the digital image. The geometric model 208 utilizes an energy function, and iteratively optimizes the function to estimate various matrices (e.g., a camera intrinsic parameter matrix, an orientation matrix), which can then be used to estimate the vanishing points, vanishing lines, and camera parameters for an image. However, as discussed above, the geometric model 208 may be inaccurate in estimation for images without strong geometric cues, or with many curved or close parallel lines.

For example, in one or more embodiments, the camera parameter determination system 114 applies the geometric model 208 by utilizing the approach described by Elya Shechtman, Jue Wang, Hyunjoon Lee, and Seungyong Lee in Camera Calibration and Automatic Adjustment Of Images, U.S. Pat. No. 9,098,885B2, hereby incorporated by reference in its entirety. Similarly, the camera parameter determination system 114 can apply the geometric model 208 by utilizing the approach described by Hyunjoon Lee, Eli Shechtman, Jue Wang, and Seungyong Lee in Automatic Upright Adjustment of Photographs, Journal of Latex Class Files, Vol. 6, No. 1 (January 2007), hereby incorporated by reference in its entirety.

In one or more embodiments, the camera parameter determination system 114 utilizes an alternate approach in response to determining that a vanishing edge map is insufficient for the geometric model 208 to yield accurate results. For example, in response to determining that a vanishing edge map has an insufficient number vanishing lines for use in the geometric model 208 (e.g., less than a threshold number of vanishing lines that satisfy a confidence value threshold), the camera parameter determination system 114 can utilize a direct convolutional neural network approach. Specifically, in one or more embodiments, the camera parameter determination system utilizes a convolutional neural network (CNN) based approach to directly determine camera parameters for the digital image.

Figure 3A:
Figure 3A:
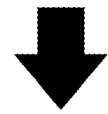
Figure 3A:
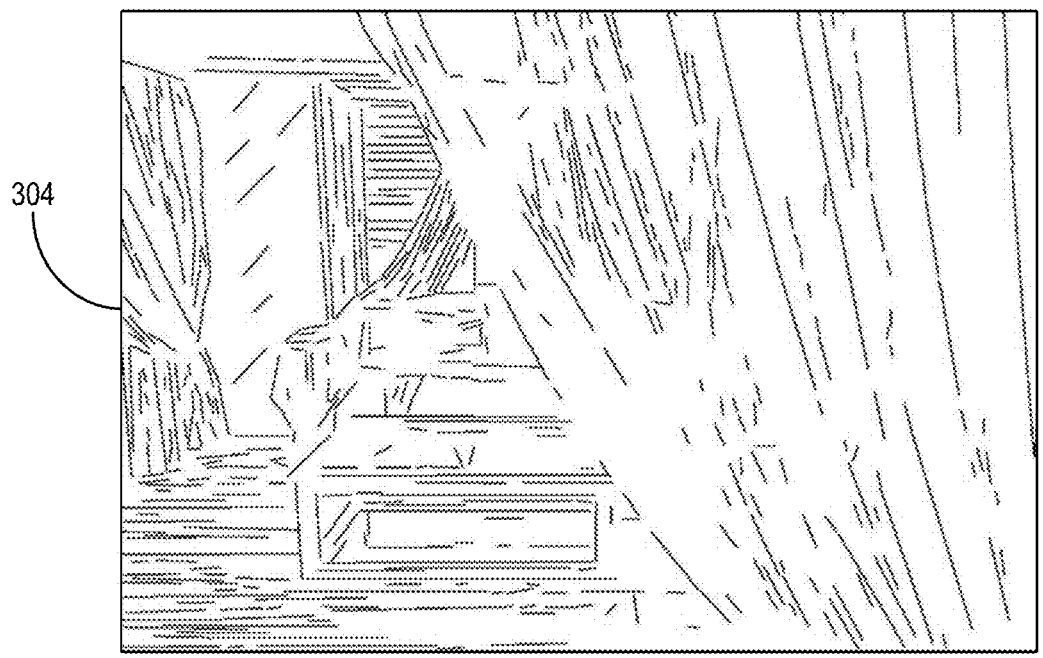
Figure 3B:
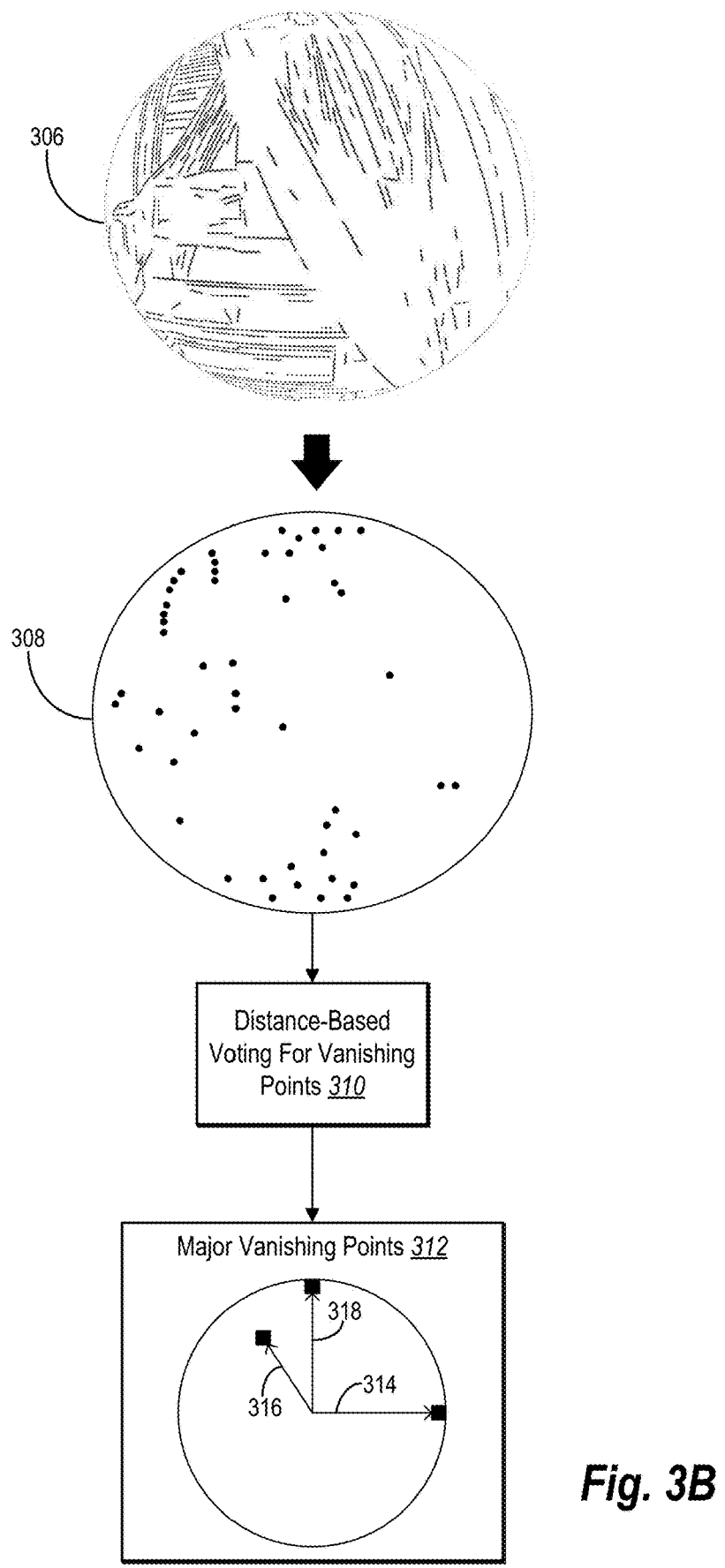

As mentioned above, the camera parameter determination system 114 can generate ground truth data for training a critical edge detection neural network. FIGS. 3A-3C illustrate generating ground truth data in accordance with one or more embodiments. More specifically, FIGS. 3A-3C illustrate the camera parameter determination system identifying lines in a digital image and determining whether each line is a vanishing line to generate a set of ground truth vanishing lines for the digital image. In particular, FIG. 3A illustrates the camera parameter determination system 114 generating an unfiltered edge map. Then, FIG. 3B illustrates the camera parameter determination system 114 mapping the unfiltered edge map onto a spherical panorama and identifying major vanishing points. Additionally, FIG. 3C shows the camera parameter determination system 114 utilizing major vanishing points and an unfiltered edge map to generate a ground truth edge map.

As shown in FIG. 3A, the camera parameter determination system 114 receives a digital image 302 and generates, based on the digital image 302, an unfiltered edge map 304. The unfiltered edge map 304 includes lines detected from the digital image 302, (i.e. both vanishing lines and non-vanishing lines from the digital image 302). To generate the unfiltered edge map 304, the camera parameter determination system 114 applies an edge detection algorithm to the digital image 302 to identify each of the lines from the digital image.

As shown in FIG. 3B, the camera parameter determination system 114 can map the unfiltered edge map 304 onto a sphere (i.e., a spherical panorama comprising a sphere or a portion of a sphere), generating an edge mapped sphere 306. The edge mapped sphere 306, like the unfiltered edge map 304, includes the detected lines from the digital image 302. After mapping the unfiltered edge map 304 onto the sphere, the camera parameter determination system 114 divides the edge mapped sphere 306 into various regions or "bins." Further, in one or more embodiments, the camera parameter determination system 114 identifies each intersection on the edge mapped sphere 306 and, based on these intersections, generate the intersection mapped sphere 308.

As mentioned above, in one or more embodiments, the camera parameter determination system 114 may map the training lines from a panoramic digital image onto a spherical panorama (e.g., a sphere or a spherical shape). The camera parameter determination system 114 can then "sample" different portions of the panoramic digital image by dividing the image into several different, potentially overlapping sub-images. The camera parameter determination system 114 can prepare these sub-images as training images and can perform the steps enumerated below with regard to FIGS. 3B-3C and utilize the images as training images when training the critical edge detection neural network.

As shown in FIG. 3B, the camera parameter determination system 114 can perform distance-based voting for vanishing points 310. As discussed above, in one or more embodiments, the camera parameter determination system 114 can determine a set of "bins" or regions on the spheres 306, 308. In one or more embodiments, the camera parameter determination system 114 divides the sphere uniformly or evenly. Further, in one or more embodiments, the camera parameter determination system 114 can determine distance-based "votes" for the lines on the edge mapped sphere 306 and/or the intersections on the intersection mapped sphere 308. The camera parameter determination system 114 can perform a Hough Transform on the detected line segments on the edge mapped sphere 306, or any of a variety of similar transformations.

More specifically, the camera parameter determination system 114 can utilize any of a variety of voting schemes to determine the major vanishing points for the digital image 302. The camera parameter determination system 114 can determine votes from pixels, lines, or intersections based on distance from or orientation with regard to the various potential vanishing points. For example, the camera parameter determination system 114 can initiate a pairwise voting scheme in which intersections between lines are considered with respect to each of the lines involved in the intersection. In another embodiment, the camera parameter determination system 114 can determine angular distances between each of the lines on the edge mapped sphere 306 and each to the potential vanishing points to determine "votes."

Finally, based on the voting, the camera parameter determination system 114 can determine major vanishing points 312 for the image. In one or more embodiments, the camera parameter determination system 114 identifies a predetermined number of vanishing points (e.g., the top three bins as the top three vanishing points). In other embodiments, the camera parameter determination system 114 identifies any number of vanishing points (e.g., any vanishing points that satisfy a threshold number or percentage of votes). In some embodiments, the camera parameter determination system 114 identifies vanishing points corresponding to mutually orthogonal vanishing directions. For example, horizontal vanishing directions 314, 316, and vertical vanishing direction 318 are mutually orthogonal.

As shown in FIG. 3C, the camera parameter determination system 114 utilizes the major vanishing points 312 and the unfiltered edge map 304 to perform act 320 of weighting lines to generate the ground truth edge map 322. Specifically, the camera parameter determination system 114 can weight each of the lines in the unfiltered edge map 304. The camera parameter determination system 114 can determine weights (i.e., training weights) for each of the lines based on the distances between each of the lines and the major vanishing points of the image 302, and/or based on alignment of the lines with each of the major vanishing points of the image 302.

These training weights can reflect a probability or confidence value that each of the weighted lines are vanishing lines. In one or more embodiments, the weights are based on the distance from one or more of the identified vanishing points and the lines, intersections between the lines, or pixels making up the lines. For example, the weights can be based on an angular distance between a vanishing point and the line. In another example, the weights can be based on linear distances between line intersections and the vanishing points. The camera parameter determination system 114 can then assign weights based on these measured distances, and determine weights based on a linear relationship between the distance and the weight itself.

In one or more embodiments, the camera parameter determination system 114 can then use the weights for each of the lines to generate the ground truth edge map 316. The camera parameter determination system 114 can determine which lines to include as vanishing lines in the ground truth vanishing edge map 322. In one or more embodiments, the weighting can include a threshold at which a weight is considered a vanishing line. That is, a weight above a predetermined threshold will cause the camera parameter determination system 114 to include the weighted line in the ground truth vanishing edge map 322, while a weight below the predetermined threshold will cause the camera parameter determination system 114 to exclude the weighted line from the ground truth vanishing edge map 322.

The camera parameter determination system 114 can utilize further classifications of lines in the digital image. For example, the camera parameter determination system 114 can utilize multiple (e.g., two or more) predetermined thresholds, one that determines a high weight within the vanishing edge map 316, and one that determines a low weight within the vanishing edge map 316. These two thresholds are given by way of example, and it will be appreciated that the camera parameter determination system 114 could utilize any number of weight thresholds that are helpful in the context of the images to be processed. Moreover, as mentioned above, the camera parameter determination system 114 can utilize continuous weights that reflect distance from vanishing points.

Thus, as illustrated in FIG. 3C, the camera parameter determination system 114 generates a set of ground truth vanishing lines as part of the ground truth vanishing edge map 322. The camera parameter determination system 114 can repeat the acts illustrated in FIGS. 3A-3C for a plurality of digital images (e.g., from an existing repository of digital images) and generate a plurality of ground truth vanishing edge maps that reflect the ground truth vanishing lines for each digital image.

Figure 4:
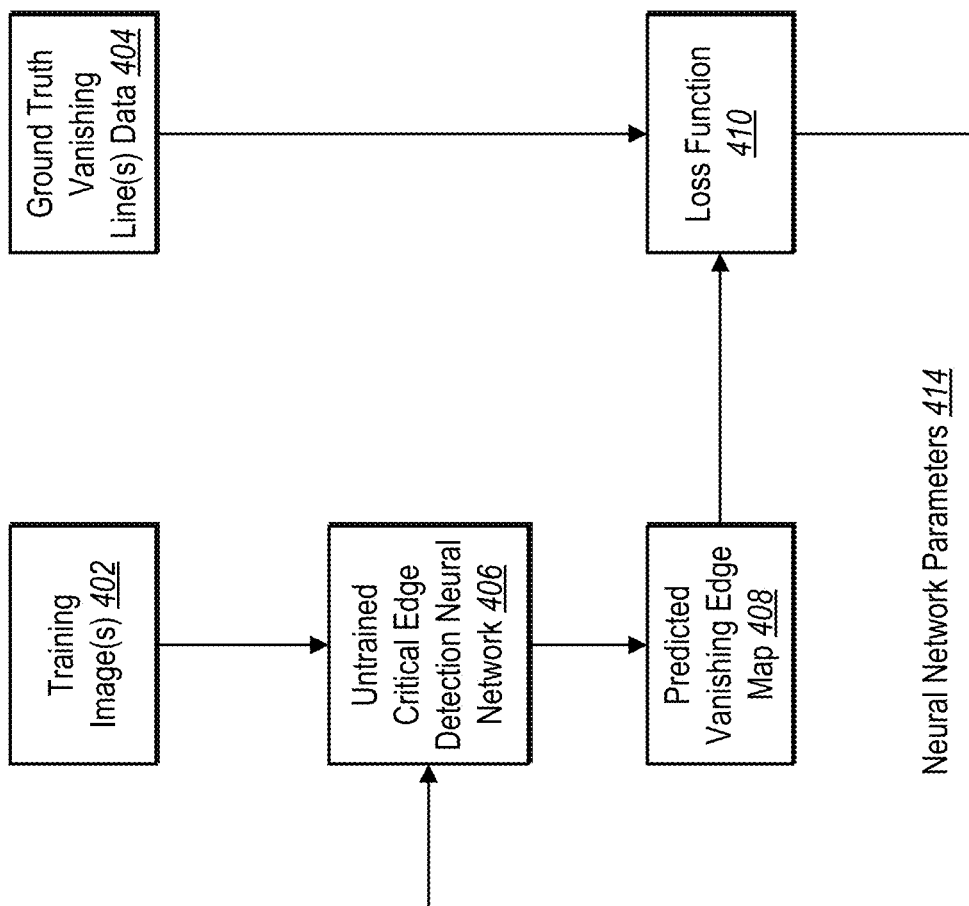
FIG. 4 illustrates a flowchart for training a critical edge detection neural network in accordance with one or more embodiments.

As mentioned above, the camera parameter determination system 114 can utilize training digital images ground truth vanishing lines to train a critical edge detection neural network. For example, FIG. 4 illustrates the camera parameter determination system 114 training a critical edge detection neural network 204 to accurately determine vanishing lines in accordance with one or more embodiments. In particular, in relation to FIG. 4, the camera parameter determination system 114 utilizes the training image(s) 402 and corresponding ground truth vanishing line(s) data 404 to train the critical edge detection neural network 204.

As shown in FIG. 4, the camera parameter determination system 114 utilizes training image(s) 402 and the associated ground truth vanishing line(s) data 404 to train the untrained critical edge detection neural network 406. As discussed above with regard to FIG. 3, the camera parameter determination system 114 can utilize the training image(s) 402 to generate the ground truth vanishing line(s) data 404. In one or more embodiments, the untrained critical edge detection neural network 406 utilizes the training image(s) 402 and the ground truth vanishing line(s) data 404 to learn to accurately identify vanishing lines from a digital image.

Specifically, as shown in FIG. 4, the camera parameter determination system 114 utilizes the critical edge detection neural network 406 to generate predicted vanishing edge map(s) 408. In particular, the critical edge detection neural network analyzes the training image(s) 402 to generate a plurality of predicted vanishing lines. For example, the critical edge detection neural network can predict, for each pixel, whether the pixel belongs to a vanishing line within the training image(s) 402.

Then, as shown in FIG. 4, the camera parameter determination system 114 compares the training vanishing edge map(s) 408 for the training image(s) 402 with the ground truth vanishing line(s) data 404. More specifically, the camera parameter determination system 114 compares the training vanishing edge map(s) 408 with the ground truth vanishing lines for the corresponding training image 402 utilizing a loss function 410 that generates a calculated loss. In particular, the loss function 410 can determine a measure of loss (e.g., a measure of differences) between the ground truth vanishing line(s) data 404 and the vanishing lines in the training vanishing edge map 408.

Further, as shown in FIG. 4, the camera parameter determination system 114 then utilizes the calculated loss to learn to more accurately identify vanishing lines from a digital image. For example, the camera parameter determination system 114 modifies the neural network parameters 414 (e.g., internal weights for layers of the neural network) to reduce or minimize the loss. Specifically, the camera parameter determination systems utilize back-propagation techniques to modify internal parameters of the critical edge detection neural network 406 to reduce the loss resulting from application of the loss function 410.

Figure 5:
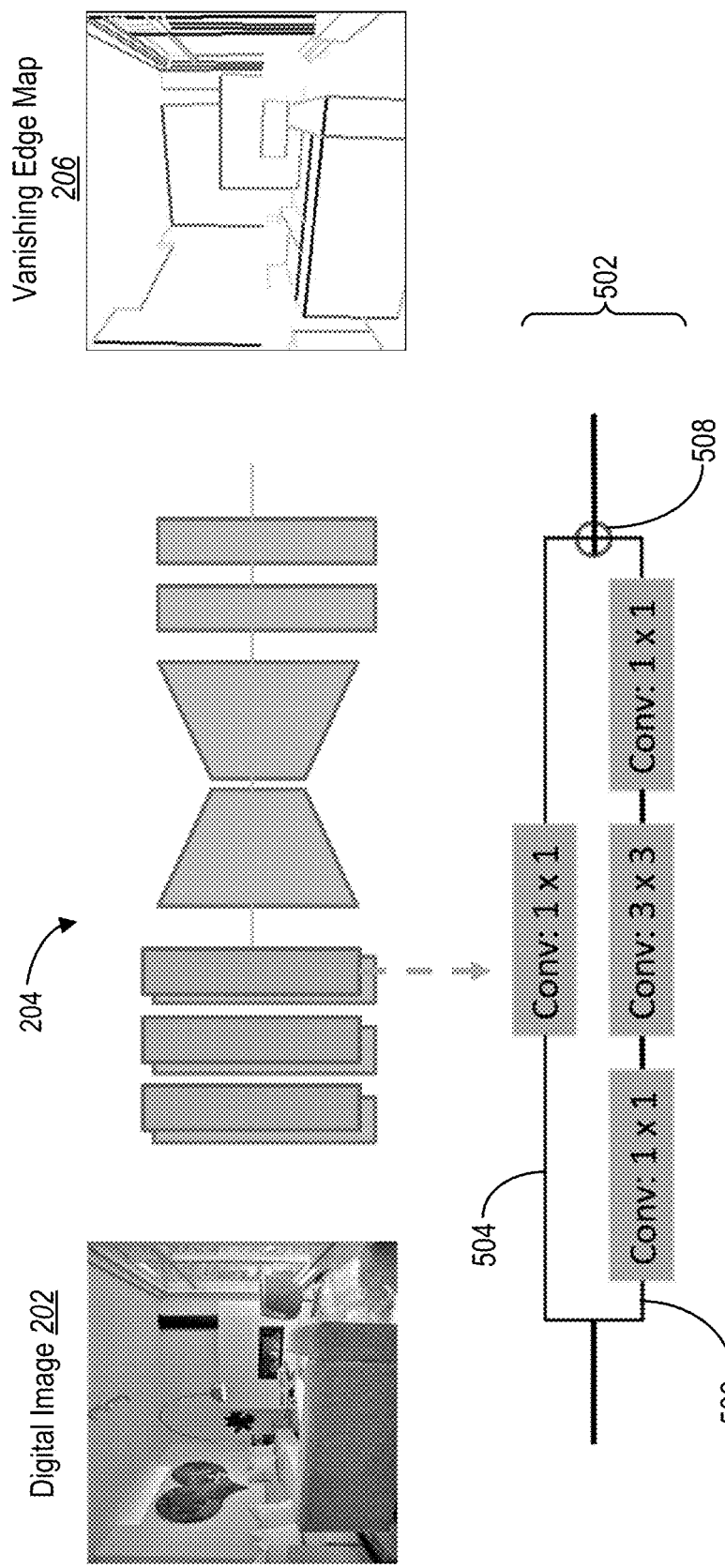
FIG. 5 illustrates utilizing a critical edge detection neural network to generate a vanishing edge map in accordance with one or more embodiments.

By repeatedly analyzing training images, generating predicted vanishing edge maps, comparing the predicted vanishing edge maps with ground truth vanishing lines, and modifying neural network parameters, the camera parameter determination system 114 can train the critical edge detection neural network 406 to accurately identify vanishing lines from digital images. Indeed, in one or more embodiments, the camera parameter determination system 114 iteratively trains the critical edge detection neural network 406 for a threshold amount of time, for a threshold number of iterations, or until a threshold loss is achieved. As mentioned above, in one or more embodiments, the camera parameter determination system 114 utilizes a critical edge detection neural network that comprises a convolutional neural network architecture. For example, FIG. 5 illustrates an exemplary architecture and application of the critical edge detection neural network 204 in accordance with one or more embodiments. As shown in FIG. 5, and as discussed with regard to FIG. 2, the critical edge detection neural network 204 receives the digital image 202, identifies the vanishing lines in the digital image 202, and generates the vanishing edge map 206 including the vanishing lines form the digital image 202.

The critical edge detection neural network 204 can perform pixel-wise prediction on the digital image 202. In particular, the critical edge detection neural network can utilize a variant of an hourglass network. Accordingly, in one or more embodiments, the critical edge detection neural network performs bottom-up processing by subsampling feature maps corresponding to the digital image 202 and performs top down process by up sampling the feature maps, with combination of higher resolution features from bottom layers. Instead of using standard residual units (e.g., convolutional blocks) as the basic building block of the critical edge detection neural network 204, in one or more embodiments, the critical edge detection neural network 204 includes an inception-like pyramid of features to identify vanishing lines. In this manner, the camera parameter determination system 114 can capture multi-scale visual patterns (or semantics) in analyzing the digital image 202.

Generally, the structure of an hourglass neural network includes roughly equal top-down and bottom-up processing, and many contain two or more hourglass structures so that data is alternately bottom-up and top-down processed. This architecture allows the neural network to capture information at every scale and combine information across various resolutions and has seen great success with regard to identification of objects in images. The specific structure of the various layers may vary depending on the purpose of the specific neural network but employs a convolutional-deconvolutional architecture that assists in pixel-wise prediction. For example, in one or more embodiments, the camera parameter determination system 114 can utilize an hourglass neural network as described by Alejandro Newell, Kaiyu Yang, and Jia Deng in European Conference on Computer Vision (2016), Stacked Hourglass Networks for Human Pose Estimation, hereby incorporated by reference in its entirety.

To illustrate, as shown in FIG. 5, the critical edge detection neural network 204 includes a plurality of pyramid feature units 502. In particular, the critical edge detection neural network 204 utilizes various pyramid features similar to a pyramid feature network (PFN). Within these pyramid features, the critical edge detection neural network 204 can include various parallel convolutional layers, similar to those found in a convolutional neural network (CNN) or more specifically an inception network.

As shown in FIG. 5, the critical edge detection neural network 204 includes multiple convolutional layers including various convolution operations. For example, FIG. 5 shows an upper convolutional branch 504 with a 1×1 convolution operation and a lower convolutional branch 506 with a 1×1 convolution operation, a 3×3 convolution operation, and another 1×1 convolution operation. Together, these convolutional branches 504, 506 make up a pyramid feature unit. As illustrated, the upper convolutional branch 504 is in parallel with the lower convolutional branch 506. The pyramid feature unit 502 receives input and performs convolution operations on the input according to each of the convolutional branches 504, 506. Then, at the output 508, the critical edge detection neural network 204 concatenates the results and sends them to the next module. This approach helps to preserve more detail in vanishing line segments, avoiding blurred or fuzzy heat maps that may result from applying more traditional convolutional blocks.

In one or more embodiments, the critical edge detection neural network 204 generates the vanishing edge map 206 by determining a confidence value for each pixel. The confidence value indicates a measure of confidence from the critical edge detection neural network that the pixels correspond to (e.g., are included in or a part of) a vanishing line. In other embodiments, the critical edge detection neural network 204 may determine confidence values for each line. The critical edge detection neural network 204 can utilize these confidence values to determine which pixels and/or lines from a digital image to include in the vanishing edge map 206 as vanishing lines. In one or more embodiments, this determination is based on a predetermined threshold value that the confidence value must comply with for inclusion. As mentioned above, the camera parameter determination system 114 can then "feed" the vanishing edge map 206 to a geometric model, which will then only consider lines included in the vanishing edge map, to determine various camera parameters for the digital image.

Further, the critical edge detection neural network 204 can determine weights for the pixels and/or lines in a digital image based on the confidence values corresponding to those pixels and/or lines. Then, based on these weights, the critical edge detection neural network can generate a weighted vanishing edge map that reflects the assigned weights within the edge map itself. That is, in one or more embodiments, the critical edge detection neural network 204 may generate a weighted vanishing edge map that reflects a measure of confidence for each of the vanishing lines included therein. To illustrate, the weighted vanishing edge map can reflect that pixels and/or lines with a higher confidence value should be given greater consideration by the geometric model, while pixels and/or lines with a lower confidence value should be given lesser consideration by the geometric model. Accordingly, the camera parameter determination system 114 can utilize the geometric model and weighted vanishing edge map to determine camera parameters.

In addition to (or in the alternative to) confidence values, the camera parameter determination system 114 can also determine weights based on line length. In particular, the camera parameter determination system 114 can give heavier weights to pixels/lines that correspond to longer vanishing lines. Similarly, the camera parameter determination system 114 can give reduced weights to pixels/lines that correspond to shorter vanishing lines. Thus, the camera parameter determination system 114 can emphasize and/or de-emphasize pixels/lines based on confidence values and/or line length.

The vanishing lines in the vanishing edge map 206 can correspond to different vanishing points (e.g., vanishing directions). More specifically, the vanishing edge map 206 can include vertical vanishing lines (e.g., vanishing lines with intersections corresponding to vertical vanishing directions) and horizontal vanishing lines (e.g., vanishing lines with intersections corresponding to horizontal vanishing directions). It will be appreciated that the camera parameter determination system 114 can utilize both vertical and horizontal vanishing lines to determine camera parameters for a digital image. That is, the critical edge detection neural network 204 can determine both vertical vanishing lines and horizontal vanishing lines and can generate a vanishing edge map 206 including both types of vanishing lines. The camera parameter determination system 114 can utilize this vanishing edge map 206 and a geometric model to determine camera parameters for the digital image.

Figure 6:
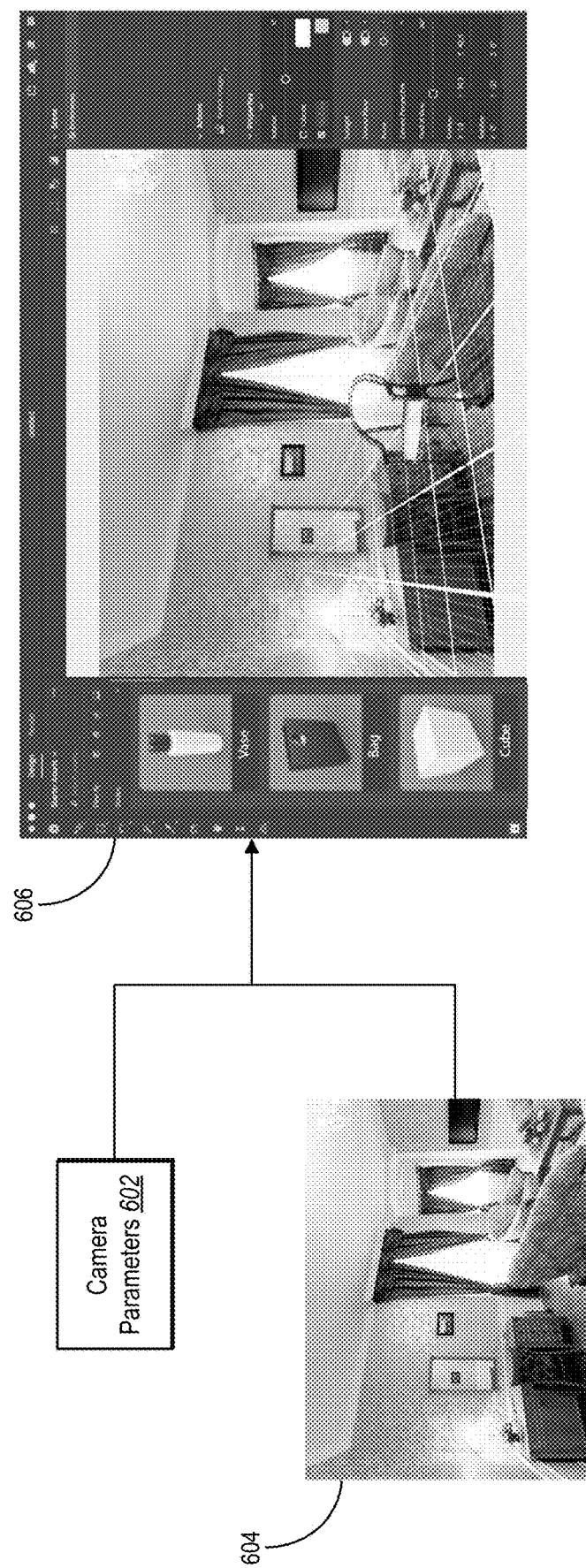
FIG. 6 illustrates utilizing camera parameters of a digital image to generate an enhanced digital image in accordance with one or more embodiments.

As discussed above with regard to FIG. 2, the camera parameter determination system 114 can utilize a vanishing edge map and geometric model to determine camera parameters for a single digital image. For example, FIG. 6 illustrates the camera parameter determination system 114 utilizing camera parameters 602 for a digital image 604 to perform various actions with the digital image 604. For example, the camera parameter determination system 114 presents a graphical user interface 606 for modifying the digital image. Based on user interaction with the graphical user interface 606, the camera parameter determination system 114 can utilize the camera parameters 602 to generate an enhanced digital image.

For example, as shown in FIG. 6, the camera parameter determination system 114 utilizes the camera parameters 602 to add a chair to the digital image 604. The camera parameter determination system 114 utilizes the camera parameters 602 to properly orient the char within the three-dimensional space (e.g., the scene) portrayed in the digital image 604. Indeed, as illustrated the camera parameters indicate camera pitch, roll, and yaw which allows the geometric model to properly orient the chair along properly within the digital image. Though FIG. 6 shows adding an object to the digital image 604, it will be appreciated that the camera parameter determination system 114 can perform any of a variety of photo editing functions including deleting objects, modifying lighting or texture, combining images, or any other editing function. Moreover, the camera parameters can also be utilized to generate a three-dimensional model of the scene portrayed in the digital image.

Further, as shown in FIG. 6, the camera parameter determination system 114 provides visual aids for display with the digital image 604 based on the camera parameters 602 to facilitate photo editing (e.g., by enabling more precise interaction with the user interface). Specifically, the camera parameter determination system 114 provides visual lines corresponding to vanishing points within the digital image 604. This approach enables precision in editing, necessitating fewer interactions before achieving a desired result.

Additionally, the camera parameter determination system 114 can utilize the camera parameters 602 in an image search context. For example, in one or more embodiments, the camera parameter determination system 114 utilizes the camera parameters 602 to identify digital images from an image database with similar or the same camera parameters. Specifically, the camera parameter determination system 114 can determine camera parameters for all of the digital images in the image database. The camera parameter determination system 114 can then conduct a search based on the determined camera parameters. For instance, the camera parameter determination system 114 can provide a user interface in which the user 106 can specify search parameters based on the one or more camera parameters (e.g. images with the same pith, roll, and yaw to an input digital image). The camera parameter determination system 114, can then identify images that satisfy the search parameters.

Figure 7:
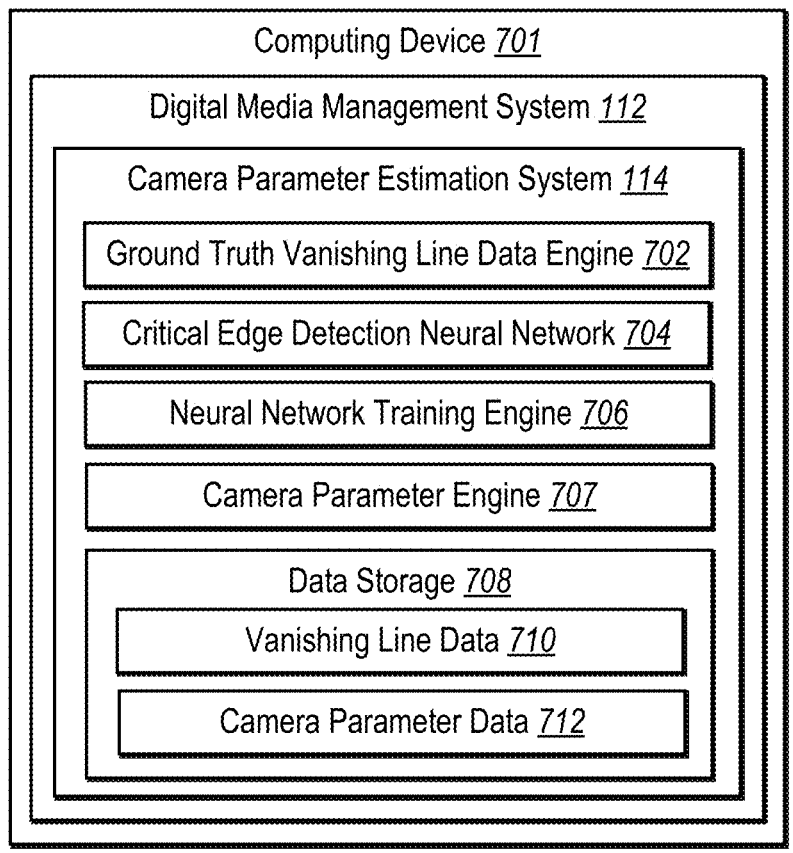
FIG. 7 illustrates a block diagram of a camera parameter determination system in accordance with one or more embodiments.

Referring now to FIG. 7, additional detail will be provided regarding capabilities and components of the camera parameter determination system 114 in accordance with one or more embodiments. In particular, FIG. 7 shows a schematic diagram of an example architecture of the camera parameter determination system 114 hosted on a computing device 701. The camera parameter determination system 114 can represent one or more embodiments of the camera parameter determination system 114 described previously.

As shown, the camera parameter determination system 114 is located on a computing device 701 as part of the digital media management system 112, as described above. In general, the computing device 701 may represent various types of computing devices (e.g. the server device(s) 110 or the client device 102). For example, in some embodiments, the computing device 701 is a non-mobile device, such as a desktop or server. In other embodiments, the computing device 701 is a mobile device, such as a mobile telephone, a smartphone, a PDA, a tablet, a laptop, etc. Additional details with regard to the computing device 701 are discussed below with respect to FIG. 10.

As illustrated in FIG. 7, the camera parameter determination system 114 includes various components for performing the processes and features described herein. For example, the camera parameter determination system 114 includes a ground truth vanishing line data engine 702, a critical edge detection neural network 704, a neural network training engine 706, a camera parameter engine 707, and a data storage 708. Each of these components is described below in turn.

As illustrated in FIG. 7, the camera parameter determination system 114 can include a ground truth vanishing line data engine 702. The ground truth vanishing line data engine 702 can create, generate and/or provide ground truth data to the camera parameter determination system 114. As discussed above with regard to FIGS. 3A-3C, the ground truth vanishing line data engine 702 can generate ground truth vanishing lines for a set of training digital images. More specifically, the ground truth vanishing line data engine 702 can map digital images onto spheres, determine intersections in a digital image, determine vanishing points in a digital image, measure various distances in a digital image, and determine ground truth vanishing lines for digital images.

Additionally, as shown in FIG. 7, the camera parameter determination system 114 also includes the critical edge detection neural network 704. As discussed above with regard to FIGS. 3-5, the critical edge detection neural network 704 can determine vanishing lines in a digital image and generate a vanishing edge map including the vanishing lines from the digital image (but not including other lines from the digital image). The critical edge detection neural network 704 can be trained by the neural network training engine 706, as discussed below.

Further, as shown in FIG. 7, the camera parameter determination system 114 also includes the neural network training engine 706. The neural network training engine 706 can train neural networks to perform various tasks utilizing ground truth data. As discussed in greater detail with regard to FIG. 4, the neural network training engine 706 can minimize a loss function and utilize ground truth data. More specifically, the neural network training engine 706 can train the critical edge detection neural network 704 to identify vanishing lines and generate vanishing edge maps. The neural network training engine 706 can use ground truth data from the ground truth vanishing line data engine 702.

Additionally, as shown in FIG. 7, the camera parameter determination system 114 includes the camera parameter engine 707. As discussed in greater detail above, the camera parameter engine 707 can determine camera parameters based on a vanishing edge map generated by the critical edge detection neural network 704. The camera parameter engine can utilize a geometric model, as described above.

Also, as shown in FIG. 7, the camera parameter determination system 114 includes the storage manager 708. The storage manager 708 can store and/or manage data on behalf of the camera parameter determination system 114. The storage manager 708 can store any data relevant to the camera parameter determination system 114. For example, the storage manager 708 can store vanishing line data 710 and camera parameter data 712.

FIG. 7 illustrates a schematic diagram of the computing device 701 upon which at least a portion of the camera parameter determination system 114 can be implemented in accordance with one or more embodiments. Each of the components 702-712 of the camera parameter determination system 114 can include software, hardware, or both. For example, the components 702-712 can include one or more instructions stored on a computer-readable storage medium and executable by processors of one or more computing devices, such as the client device 102 or server device(s) 110. When executed by the one or more processors, the computer-executable instructions of the camera parameter determination system 114 can cause the computing device(s) to perform the methods described herein. Alternatively, the components 702-712 can include hardware, such as a special-purpose processing device to perform a certain function or group of functions. Alternatively, the components 702-712 of the dynamic representation management system 114 can include a combination of computer-executable instructions and hardware.

Furthermore, the components 702-712 of the camera parameter determination system 114 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-712 may be implemented as a stand-alone application, such as a desktop or mobile application. Furthermore, the components 702-712 may be implemented as one or more web-based applications hosted on a remote server. The components 702-712 may also be implemented in a suite of mobile device applications or "apps." To illustrate, the components 702-712 may be implemented in an application, including but not limited to ADOBE® DIMENSION®, ADOBE® STOCK, ADOBE® PHOTOSHOP®, ADOBE® LIGHTROOM®, ADOBE® PAINTCAN®, ADOBE® LUMETRI™, or ADOBE PREMIERE®." ADOBE, ADOBE DIMENSION, ADOBE STOCK, PHOTOSHOP, LIGHTROOM, PAINTCAN, LUMETRI, and ADOBE PREMIERE, are either registered trademarks or trademarks of Adobe Inc. in the United States and/or other countries.

Figure 8:
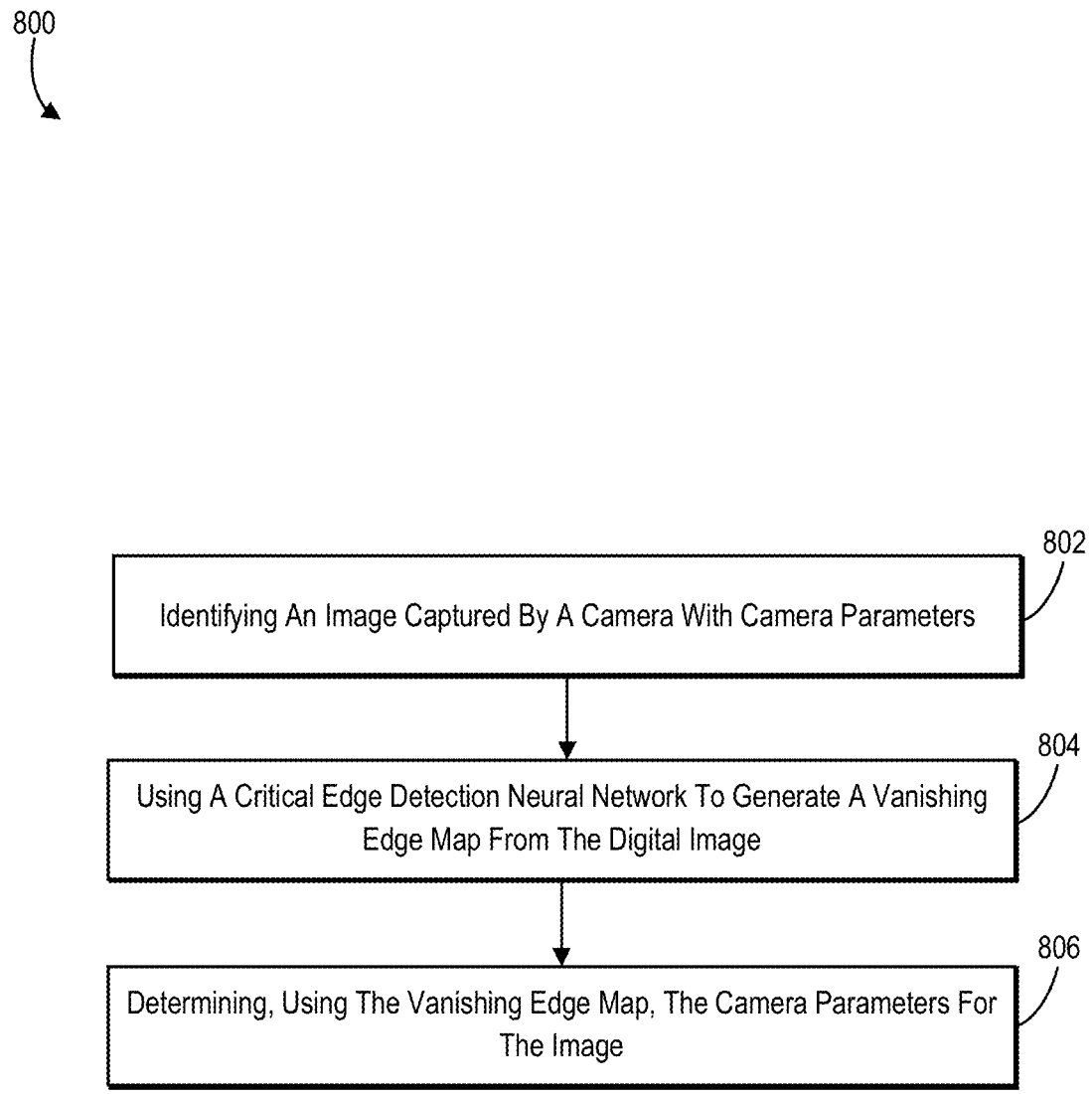
FIG. 8 illustrates a flowchart of a series of acts for utilizing a critical edge detection neural network to determine camera parameters in accordance with one or more embodiments.
Figure 9:
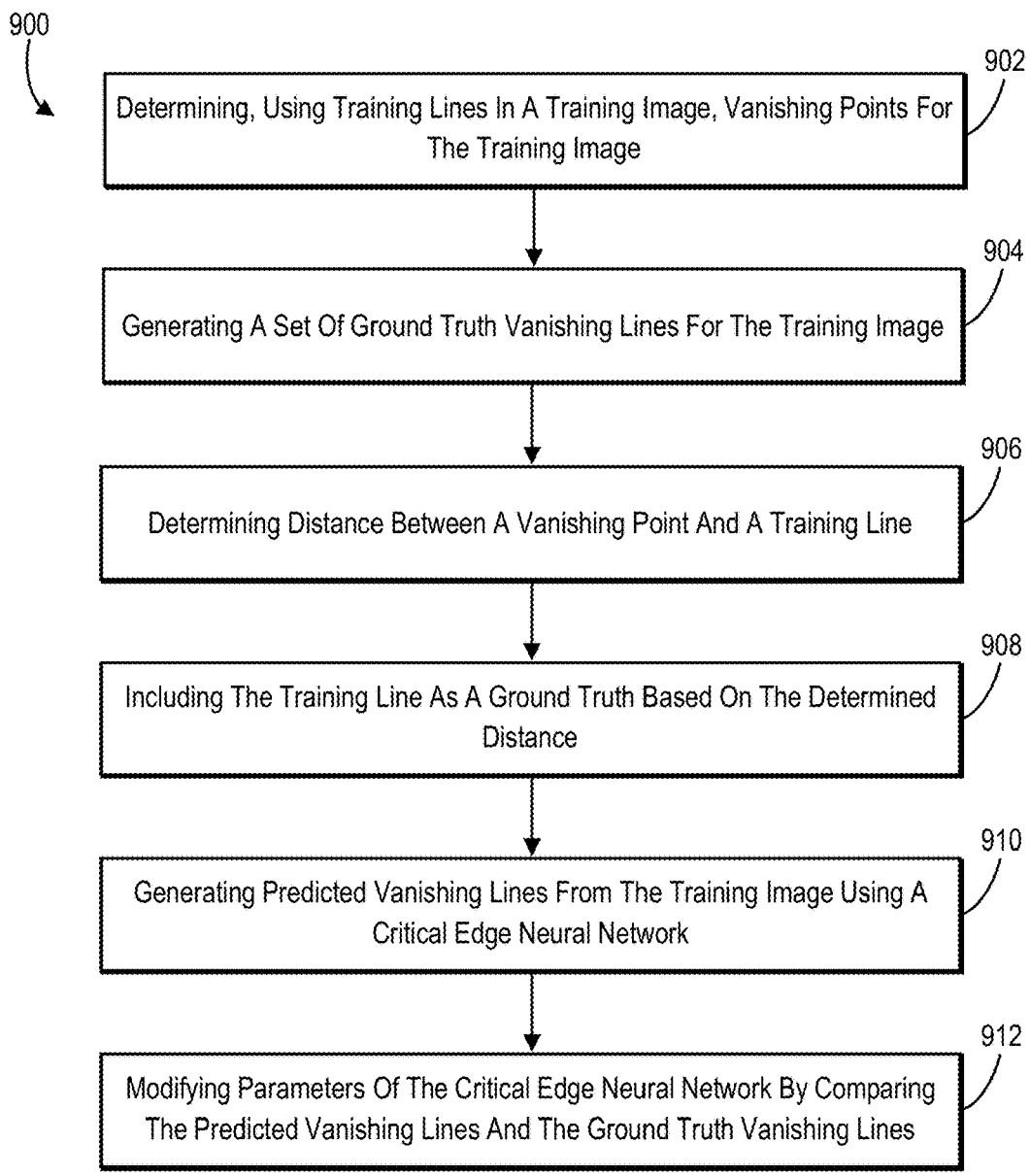
FIG. 9 illustrates a flowchart of a series of acts for training a critical edge detection neural network in accordance with one or more embodiments.

FIGS. 1-7, the corresponding text, and the examples provide a number of different methods, systems, devices, and non-transitory computer-readable media of the camera parameter determination system 114. In addition to the foregoing, one or more embodiments can also be described in terms of flowcharts comprising acts for accomplishing a particular result, as shown in FIGS. 8-9. FIGS. 8-9 may be performed with more or fewer acts. Further, the acts may be performed in differing orders. Additionally, the acts described herein may be repeated or performed in parallel with one another or parallel with different instances of the same or similar acts.

As mentioned, FIGS. 8-9 illustrate a flowchart of a series of acts 800, 900 for training and utilizing a critical edge detection neural network in accordance with one or more embodiments. While FIGS. 8-9 illustrate acts according to one embodiment, alternative embodiments may omit, add to, reorder, and/or modify any of the acts shown in FIGS. 8-9.

The acts of FIGS. 8-9 can be performed as part of a method. Alternatively, a non-transitory computer-readable medium can comprise instructions that, when executed by one or more processors, cause a computing device 701 to perform the acts of FIGS. 8-9. In some embodiments, a system can perform the acts of FIGS. 8-9.

As illustrated in FIG. 8, the series of acts 800 includes the act 802 of identifying an image captured by a camera with camera parameters. For example, the act 802 can involve identifying a digital image captured via a camera device with one or more camera parameters. The act 802 can also involve determining the one or more parameters by applying a geometric model to the first set of vanishing lines and the second set of vanishing lines. Further, the act 802 can involve identifying a digital image utilizing an image search database to identify an image with certain characteristics.

Further, as shown in FIG. 8, the series of acts 800 includes the act 804 of using a critical edge detection neural network 204 to generate a vanishing edge map from the digital image. For example, the act 804 can involve utilizing a critical edge detection neural network 204 to generate a vanishing edge map from the digital image, wherein the vanishing edge map comprises a plurality of vanishing lines from the digital image corresponding to vanishing points in the digital image, and wherein the critical edge detection neural network 204 is trained to generate vanishing edge maps from training digital images and ground truth vanishing lines corresponding to ground truth vanishing points of the training digital images. Further, the act 804 may involve using the critical edge detection neural network 204, wherein the vanishing edge map comprises the vanishing lines from the digital image. Further, the act 804 may involve using a critical edge detection neural network 204 to generate a weighted vanishing edge map that reflects the confidence and/or probability that each line is a vanishing line. The act 804 can also include generating the vanishing edge map by generating a first set of vanishing lines with intersections corresponding to a vanishing point corresponding to a horizontal vanishing direction and a second set of vanishing lines having a second intersection corresponding to a vanishing point corresponding to vertical vanishing direction.

The vanishing edge map of act 804 may comprise confidence values corresponding to pixels of the digital image, the confidence values comprising a measure of confidence that the pixels correspond to the vanishing lines. Further, the act 804 may include determining weights for the plurality of lines based on the confidence values, generating a weighted vanishing edge map based on the weights for the plurality of lines, and generating the one or more camera parameters based on the weighted vanishing edge map. Further, the critical edge detection neural network 204 of act 804 may comprise a convolutional neural network.

Additionally, as shown in FIG. 8, the series of acts 800 includes the act 806 of determining, using the vanishing edge map, the camera parameters for the image. For example, the act 806 can involve determining, utilizing the vanishing edge map, the one or more camera parameters corresponding to the digital image. The act 806 may also involve determining, using a weighted vanishing edge map, the one or more camera parameters for the digital image. The act 806 can also include determining the camera parameters by placing greater consideration on pixels and/or line segments given greater weight in the weighted vanishing edge map and lesser consideration on pixels and/or line segments given lesser weight in the weighted vanishing edge map.

Further, the camera parameters of act 806 can comprise at least one of focal length, pitch, roll, or yaw. The act 806 may also involve utilizing a geometric model to determine the one or more camera parameters for the digital image. Further, the geometric model can determine the one or more camera parameters for the digital image based on the vanishing lines included in the vanishing edge map, and not including other lines from the digital image. Further, the act 806 may involve utilizing the geometric model to determine the camera parameters for the image, wherein the geometric model determines camera parameters for the image based, at least in part, on one or more confidence values and/or weights associated with the vanishing lines included in the vanishing edge map.

Moving to FIG. 9, the series of acts 900 includes the act 902 of determining, using training lines in a training image, vanishing points for the training image. For example, the act 902 can involve determining, utilizing training lines in the training digital image of the plurality of training images, vanishing points for the training digital image. The act 902 can also involve subdividing the training digital image into regions. Further, the act 902 can include determining a predetermined number of major vanishing points based on regions receiving the most votes in a voting scheme.

The act 902 can also involve mapping the training lines to a spherical panorama, analyzing the training lines to generate a plurality of votes for a plurality of candidate vanishing regions, and determining the vanishing points from the plurality of candidate vanishing regions based on the plurality of votes. Additionally the act 902, can involve a voting scheme wherein each pixel in the image votes for one or more regions of the training digital image as a vanishing point. Further, the act 902 can include a voting scheme wherein each line in the training digital image votes for one or more regions of the image as a vanishing point. Further, the act 902 can involve applying a Hough Transformation (or any of a variety of similar transformations) to the training lines on the spherical panorama. Additionally, the act 902 can involve determining a vertical vanishing point, a first horizontal direction, and a second horizontal direction for the training digital image.

Also, as shown in FIG. 9, the series of acts 900 includes the act 904 of generating a set of ground truth vanishing lines for the training image. For example, the act 904 can involve utilizing an edge mapped sphere to generate a set of ground truth vanishing lines for the training digital image. Additionally, the act 904 can involve subdividing the edge mapped sphere into a plurality of sub-images and determining vanishing lines for each of the various sub-images for use as training images for the critical edge detection neural network.

Also, as shown in FIG. 9, the series of acts 900 includes the act 906 of determining distance between a vanishing point and a training line. For example, the act 906 can involve determining a distance between a vanishing point of the vanishing points and a training line. The act 906 may also involve determining a first angular distance between a first vanishing line of the vanishing lines and a first vanishing point of the vanishing points. Further, the act 906 can involve determining distances between one or more intersections of one or more line segments and one or more of the vanishing points.

Additionally, as shown in FIG. 9, the series of acts 900 includes the act 908 of including the training line as a vanishing lie based on the determined distance. For example, the act 908 can involve including the training line in the set of ground truth vanishing lines based on the distance between the vanishing point and the training line.

The act 908 can also involve determining, based on the distance between the vanishing point and the training line, a weight for the training line, and comparing the weight for the training line with a distance threshold. The act 908 can additionally involve including the training line in the set of ground truth vanishing lines based on comparing the weight for the training line with the distance threshold.

Further, as shown in FIG. 9, the series of acts 900 includes the act 910 of generating predicted vanishing lines from the training image using a critical edge neural network. For example, the act 910 can involve generating predicted vanishing lines from the training digital image utilizing the critical edge detection neural network 204. The act 910 can also include utilizing a pyramid feature unit of a layer of the critical edge detection neural network, wherein the pyramid feature unit comprises a convolution operation in parallel with a series of a plurality of convolution operations. Further, the act 910 can involve concatenating results of the convolution operations from each layer of the pyramid feature unit.

Also, as shown in FIG. 9, the series of acts 900 includes the act 912 of modifying parameters of the critical edge neural network by comparing the predicted vanishing lines and the ground truth vanishing lines. For example, the act 912 can involve modifying parameters of the critical edge detection neural network 204 by comparing the predicted vanishing lines and the set of ground truth vanishing lines. Further, act 912 can involve modifying parameters of the critical edge detection neural network 204 utilizing a loss function, wherein the critical edge detection neural network modifies the parameters based on minimization of loss determined by the loss function.

In addition (or in the alternative) to the acts describe above, in some embodiments, the series of acts 800, 900 include a step for training a critical detection edge neural network to generate vanishing edge maps from training digital images. The methods and acts described in relation to FIGS. 3A-5 can comprise the corresponding acts for training a critical detection edge neural network to generate vanishing edge maps from training digital images.

In addition (or in the alternative) to the acts describe above, in some embodiments, the series of acts 800, 900 include a step for utilizing the critical edge detection neural network to generate a vanishing edge map for the digital image. The methods and acts described in relation to FIGS. 2 and 5 can comprise the corresponding acts for utilizing the critical edge detection neural network to generate a vanishing edge map for the digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
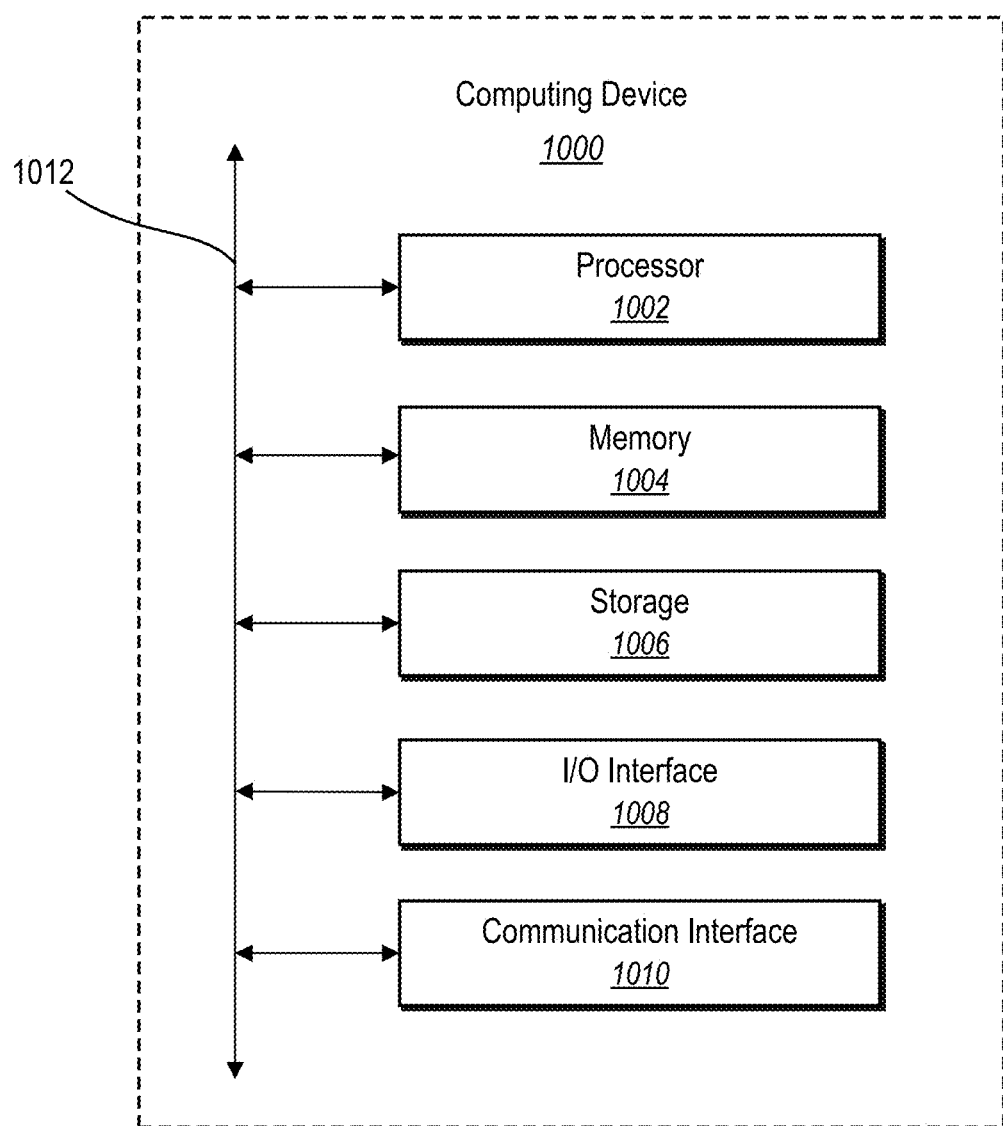
FIG. 10 illustrates a block diagram of an example computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., the computing device 701, the server device(s) 110, and the client device 102). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device 102). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computer system to:
    identify a digital image captured via a camera device with camera parameters;
    utilize a critical edge detection neural network to generate a vanishing edge map from the digital image, wherein:
        the vanishing edge map comprises a plurality of vanishing lines from the digital image corresponding to vanishing points in the digital image;
        the vanishing edge map comprises confidence values corresponding to pixels of the digital image, the confidence values comprising a measure of confidence that the pixels correspond to one or more of the plurality of vanishing lines; and
        the critical edge detection neural network is trained to generate vanishing edge maps from training digital images and ground truth vanishing lines corresponding to ground truth vanishing points of the training digital images; and
    determine, utilizing the vanishing edge map, the camera parameters corresponding to the digital image.

2. The non-transitory computer readable storage medium of claim 1, further comprising instructions that, when executed by the at least one processor, cause the computer system to generate the vanishing edge map by generating a first set of vanishing lines with intersections corresponding to a horizontal vanishing direction and a second set of vanishing lines having a second intersection corresponding to a vertical vanishing direction.

3. The non-transitory computer readable storage medium of claim 2, further comprising instructions that, when executed by the at least one processor, cause the computer system to determine the camera parameters by applying a geometric model to the first set of vanishing lines and the second set of vanishing lines.

4. The non-transitory computer readable storage medium of claim 1, further comprising instructions that, when executed by the at least one processor, cause the computer system to generate an enhanced digital image from the digital image based on the determined camera parameters.

5. The non-transitory computer readable storage medium of claim 4, further comprising instructions that, when executed by the at least one processor, cause the computer system to:
    determine weights for the plurality of vanishing lines based on the confidence values;
    generate a weighted vanishing edge map based on the weights for the plurality of vanishing lines; and
    generate the camera parameters based on the weighted vanishing edge map.

6. The non-transitory computer readable storage medium of claim 1, wherein the camera parameters comprise at least one of focal length, pitch, roll, or yaw.

7. The non-transitory computer readable storage medium of claim 1, wherein the critical edge detection neural network comprises a convolutional neural network.

8. A method for determining camera parameters for a digital image comprising:
    identifying a digital image captured via a camera device with camera parameters;
    utilizing a critical edge detection neural network to generate a vanishing edge map from the digital image, wherein:
        the vanishing edge map comprises a plurality of vanishing lines from the digital image corresponding to vanishing points in the digital image;
        the vanishing edge map comprises confidence values corresponding to pixels of the digital image, the confidence values comprising a measure of confidence that the pixels correspond to one or more of the plurality of vanishing lines; and
        the critical edge detection neural network is trained to generate vanishing edge maps from training digital images and ground truth vanishing lines corresponding to ground truth vanishing points of the training digital images; and
    determining, utilizing the vanishing edge map, the camera parameters corresponding to the digital image.

9. The method of claim 8, wherein the camera parameters comprise one or more of focal length, pitch, roll, and yaw.

10. The method of claim 8, wherein the vanishing edge map comprises one or more vanishing line from the digital image.

11. The method of claim 8, further comprising generating an enhanced digital image from the digital image based on the determined camera parameters.

12. A system comprising:
    one or more memory devices comprising:
        a digital image captured via a camera device with camera parameters; and
        a critical edge detection neural network; and
    one or more computing devices configured to cause the system to:
        utilize the critical edge detection neural network to generate a vanishing edge map from the digital image by generating a first set of vanishing lines with intersections corresponding to a horizontal vanishing direction and a second set of vanishing lines having a second intersection corresponding to a vertical vanishing direction; and
        determine, utilizing the vanishing edge map, the camera parameters corresponding to the digital image by applying a geometric model to the first set of vanishing lines and the second set of vanishing lines.

13. The system of claim 12, wherein the one or more computing devices are further configured to cause the system to reproject the digital image to align the first set of vanishing lines and the second set of vanishing lines to a plurality of vanishing points.

14. The system of claim 12, wherein the vanishing edge map comprises confidence values corresponding to pixels of the digital image, the confidence values comprising a measure of confidence that the pixels correspond to one or more of the first set of vanishing lines or the second set of vanishing lines.

15. The system of claim 14, wherein the one or more computing devices are further configured to cause the system to:
  determine weights for the first set of vanishing lines based on the confidence values;
  generate a weighted vanishing edge map based on the weights for the first set of vanishing lines; and
  generate the camera parameters based on the weighted vanishing edge map.

16. The system of claim 12, wherein the camera parameters comprise at least one of focal length, pitch, roll, or yaw.

17. The system of claim 12, wherein the critical edge detection neural network comprises a convolutional neural network.

18. The system of claim 12, wherein the one or more computing devices are further configured to cause the system to generate an enhanced digital image from the digital image based on the determined camera parameters.

19. The system of claim 12, wherein the one or more computing devices are further configured to cause the system to generate, based on the determined camera parameters, one or more visual aids for display with the digital image during image editing.

20. The system of claim 12, wherein the one or more computing devices are further configured to cause the system to conduct an image search based on the determined camera parameters.

* * * * *